(12) United States Patent
Hsiao et al.

(10) Patent No.: US 7,004,772 B1
(45) Date of Patent: Feb. 28, 2006

(54) LATCH MECHANISM FOR A PLUGGABLE OPTICAL MODULE

(75) Inventors: Cheng-Ta Hsiao, Hsinchu (TW);
Cheng-Hung Tsai, Hsinchu (TW);
Shun-Tien Lee, Hsinchu (TW); Kun-Yi Shen, Hsinchu (TW)

(73) Assignee: Industrial Technology Research Institute, Hsinchu (CN)

( * ) Notice: Subject to any disclaimer, the term of this patent is extended or adjusted under 35 U.S.C. 154(b) by 0 days.

(21) Appl. No.: 10/972,559

(22) Filed: Oct. 25, 2004

(30) Foreign Application Priority Data

Aug. 6, 2004 (TW) ................................ 093123721

(51) Int. Cl.
*H01R 13/62* (2006.01)

(52) U.S. Cl. ...................... 439/160; 439/352; 361/728

(58) Field of Classification Search ................ 439/160, 439/352; 361/728
See application file for complete search history.

(56) References Cited

U.S. PATENT DOCUMENTS

| | | | |
|---|---|---|---|
| 6,430,053 B1 * | 8/2002 | Peterson et al. | 361/728 |
| 6,439,918 B1 | 8/2002 | Togami et al. | |
| 6,494,623 B1 | 12/2002 | Ahrens et al. | |
| 6,530,785 B1 * | 3/2003 | Hwang | 439/76.1 |
| 6,533,603 B1 | 3/2003 | Togami | |
| 6,824,416 B1 * | 11/2004 | Di Mascio | 439/352 |
| 2003/0171016 A1 | 9/2003 | Bright et al. | |
| 2004/0033027 A1 | 2/2004 | Pang et al. | |

* cited by examiner

*Primary Examiner*—Truc Nguyen
(74) *Attorney, Agent, or Firm*—Welsh & Katz, Ltd.

(57) ABSTRACT

A latch mechanism for a pluggable optical module includes a boss in contact with a datum plane of a latch trough to latch and anchor the optical module. When a lever is turned, the boss is turned to press the datum plane and change the relative position to move a sliding member and release the latched and anchored condition of the optical module. The structure is simple and easy to fabricate and assemble. It also is reliable and convenient.

15 Claims, 9 Drawing Sheets

LATCH MECHANISM FOR A PLUGGABLE OPTICAL MODULE

FIELD OF THE INVENTION

The present invention relates to a latch mechanism for a pluggable optical module and particularly to a latch mechanism for a pluggable optical module that is reliable and convenient.

BACKGROUND OF THE INVENTION

In optical communication applications, the optical transceiver is an important element in a photoelectric transforming interface. Signal transmission speed may range from 155 Mb/s to 1.25 Gb/s or even 10 Gb/s. Various types of packages are available depending on application environments, such as a 1×9 pin, GBIC (GigaBit Interface Converter), SFF (Small Form Factor), SFP (Small Form Factor Pluggable), and the like. The 1×9 pin and SFF adopt a fixed packaging method that are difficult to remove once the module is installed in the system. The GBIC and SFP adopt a pluggable approach that can be removed and replaced after installing in the system.

In the design of the pluggable module, many factors have to be considered, such as electricity issues while plugging the module, reliability and convenience of the plugging mechanism. For instance, U.S. Pat. Nos. 6,439,918 and 6,533,603 assigned to Finisar Co. disclose a SFP module that has a latching mechanism ramming the bottom of the module through a lever to extend or retract the latching mechanism in the module. U.S. Pat. No. 6,494,623 assigned to Infineon Co. also discloses a SFP release mechanism, which has a lever turnable to press a locking reed of a transceiver to extend a latch of the module to escape a locking reed for releasing the module.

Another example is U.S. patent application No. 20030171016, which has a lever and elastic latch reeds located on two sides of a module for anchoring. In normal conditions, the elastic latch reeds maintain the anchor condition through a spring located therein. When the lever is moved downwards, the elastic latch reeds are moved outwards and the jutting distal ends thereof are disengaged.

Those references mostly employ latch mechanisms that are complex and require expensive elements. They also are difficult to fabricate and assemble. For instance, U.S. patent application No. 20030171016 requires two elastic latch reeds and a spring in each of them. It involves too many elements. Fabrication and assembly are difficult.

SUMMARY OF THE INVENTION

In order to solve the aforesaid disadvantages, the present invention aims to provide a latch mechanism for a pluggable optical module that is simply structured, easy to fabricate and assemble, reliable and convenient.

The latch mechanism for a pluggable optical module according to the invention includes a lever, a sliding member and a latch trough to selectively anchor the optical module on an electronic device. The lever has at least one boss to be mounted in the latch trough and is coupled with the sliding member. By turning the lever, the boss is turned at the same time to slide on a sloped surface on one side of the latch trough to a datum plane of the latch trough and change the relative position of the lever in horizontal direction, and drive the sliding member to move as well so that the optical module may be released from or anchor on the electronic device. Such a mechanism requires fewer elements, and is easier to fabricate and assemble, and also is more stable and reliable.

The foregoing, as well as additional objects, features and advantages of the invention will be more readily apparent from the following detailed description, which proceeds with reference to the accompanying drawings.

DESCRIPTION OF THE PREFERRED EMBODIMENTS

The latch mechanism according to the invention is applicable to any pluggable optical module such as an optical transceiver, light emitter, optical receiver, and the like. The following discussion is based on an optical transceiver.

Figure 1:
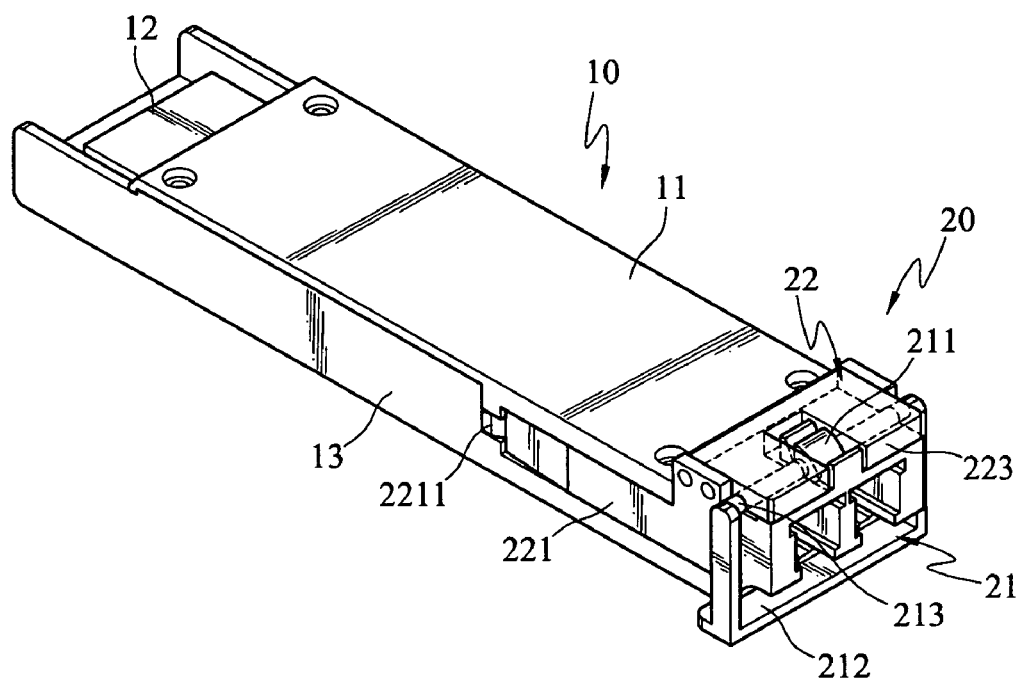
FIG. 1 is a schematic view of the invention coupled with an optical module.
Figure 2:
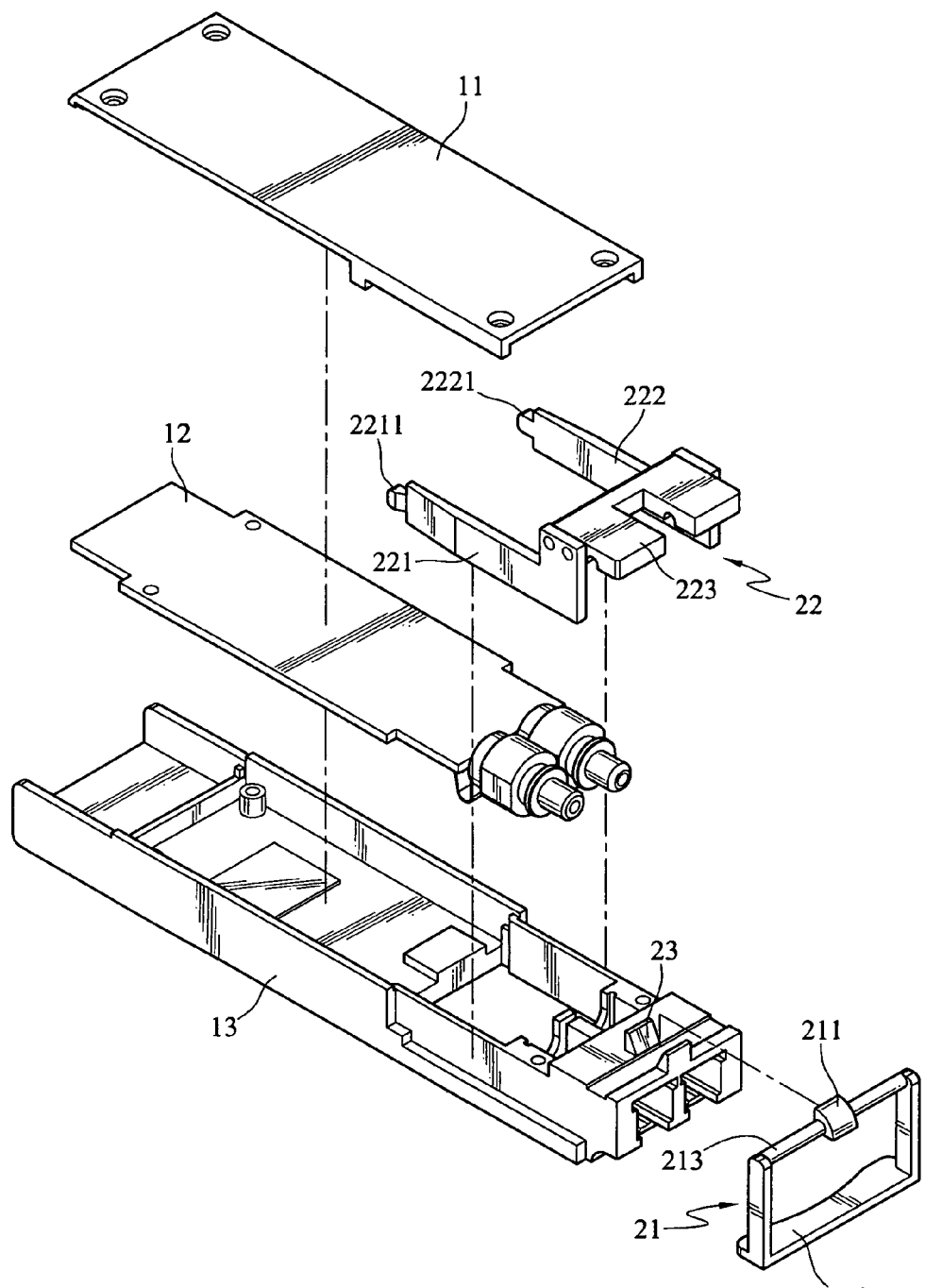
FIG. 2 is an exploded view of the invention coupled with an optical module.

Referring to FIG. 1, a latch mechanism 20 is adopted for use on an optical module 10 for selectively coupling the optical module 10 on an electronic device (not shown in the drawings). Also referring to FIG. 2, the optical module 10 includes an upper lid 11, a circuit board 12 and a lower lid 13. The latch mechanism 20 includes a lever 21, a sliding member 22 and a latch trough 23. The lever 21 is located on the front end of the optical module 10, and has a handle 212 and two struts extended from two ends of the handle 212 to fasten to an axle 213. The axle 213 is coupled with at least one boss 211. Their functions will be discussed later.

The sliding member 22 includes two sliding sections 221 and 222 that have one end bridged by a coupling section 223 and other ends with jutting latch sections 2211 and 2221 formed thereon. The latch trough 23 is to hold the boss 211 of the lever 21.

The lever 21 is coupled with one end of the optical module 10 in a turnable fashion by nestling the boss 211 in the latch trough 23. The sliding member 22 clips the optical module 10 and is slidable thereon, and also is coupled with the lever 21.

Figure 3A:
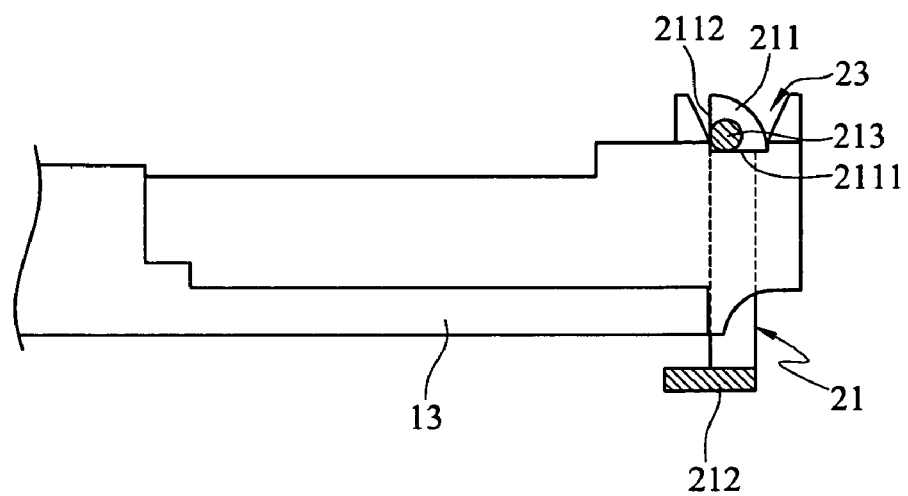
FIGS. 3A through 5B are schematic views of the invention in operating conditions.
Figure 3B:
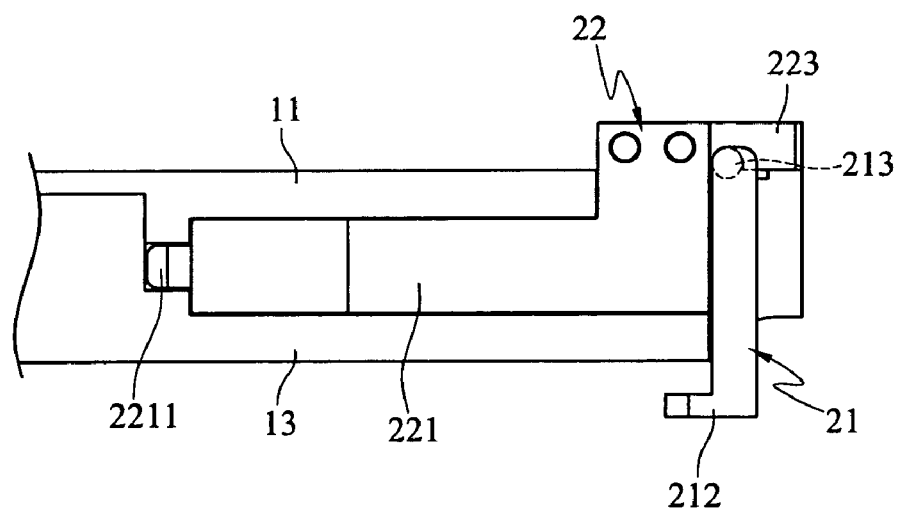
Figure 4A:
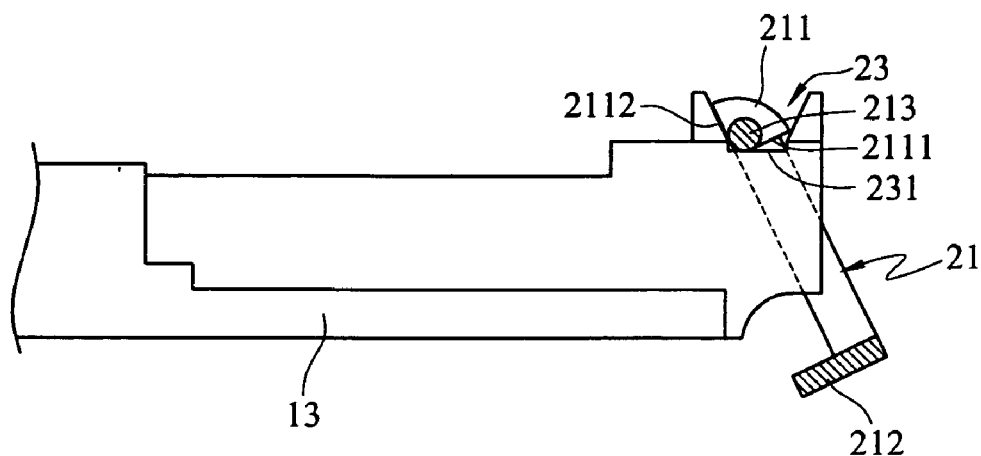
Figure 4B:
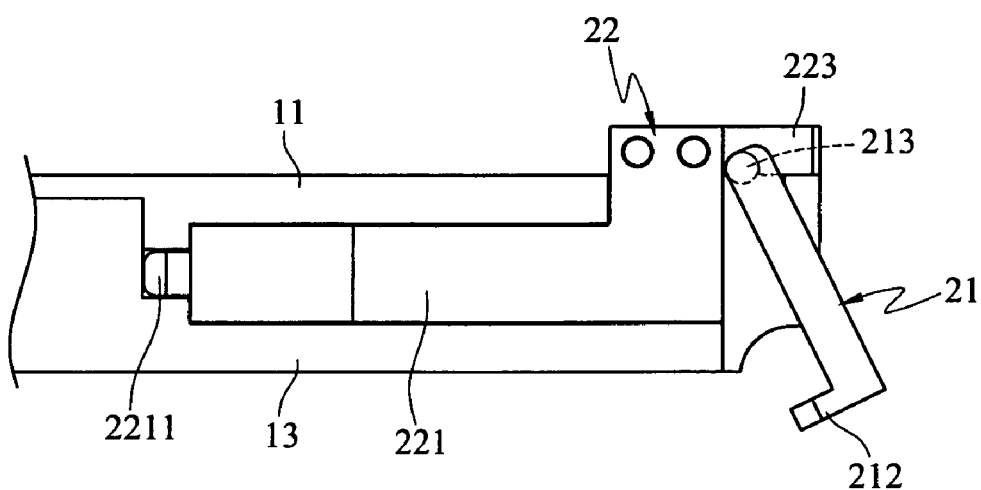

Referring to FIGS. 3A and 3B, in normal conditions, the sliding sections 221 and 222 of the sliding member 22 clip the optical module 10, and the boss 211 of the lever 21 has one side in contact with a datum plane 231 of the latch trough 23 and another side in contact with a side wall of the latch trough 23. As shown in the drawings, the cross section of the boss 211 is formed substantially in a fan shape with two chords defined as a first contact side 2111 and a second contact side 2112. The bottom side of the latch trough 23 is the datum plane 231. When the first contact side 2111 is in contact with the datum plane 231, the second contact side 2112 presses one sidewall of the latch trough 23. When the second contact side 2112 is in contact with the datum plane 231, the first contact side 2111 presses another sidewall of the latch trough 23. When the first contact side 2111 is in contact with the datum plane 231, the lever 21 and the sliding member 22 are positioned in a normal condition. The latch sections 2211 and 2221 are extended to couple on an electronic device (not shown in the drawings). With the first contact side 2111 of the boss 211 in contact with the datum plane 231, the module is in a latched and anchored condition without escaping the electronic device.

Figure 5A:
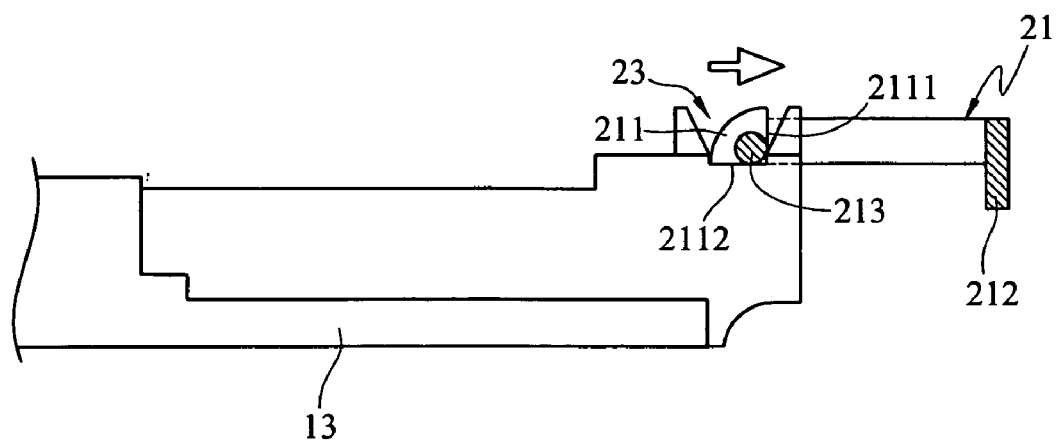
Figure 5B:
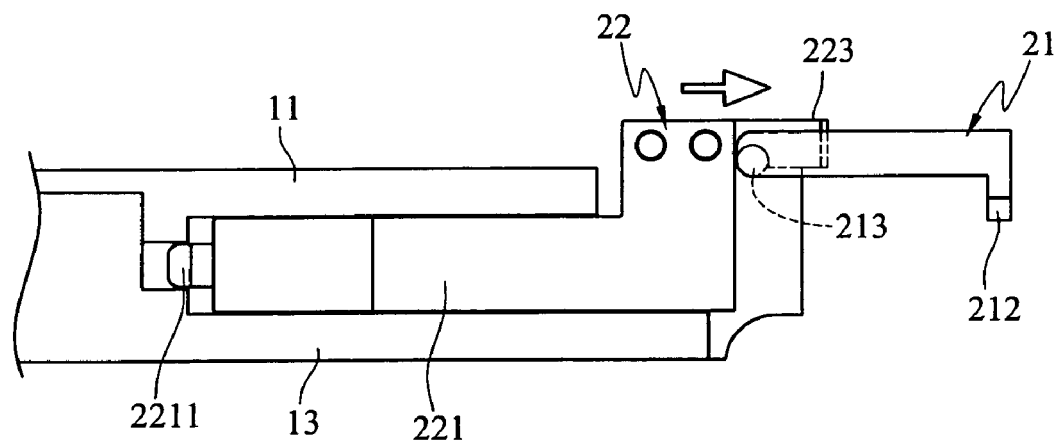

When the lever 21 is turned about the axle 213, it also turns relative to the optical module 10. The boss 211 also turns, and the first contact side 2111 leaves the datum plane 231. Referring to FIGS. 5A and 5B, with the lever and the boss 211 turning continuously, the second contact side 2112 slides over one sidewall of the latch trough 23 and moves to the datum plane 231 to form a contact condition. Meanwhile, the position of the axle 213 is shifted to push the lever 21 to move horizontally, and consequently drags the sliding member 22 coupled on the lever 21 to slide outwards. The latch sections 2211 and 2221 also slide outwards and separate from the electronic device to form a released condition.

Figure 6A:
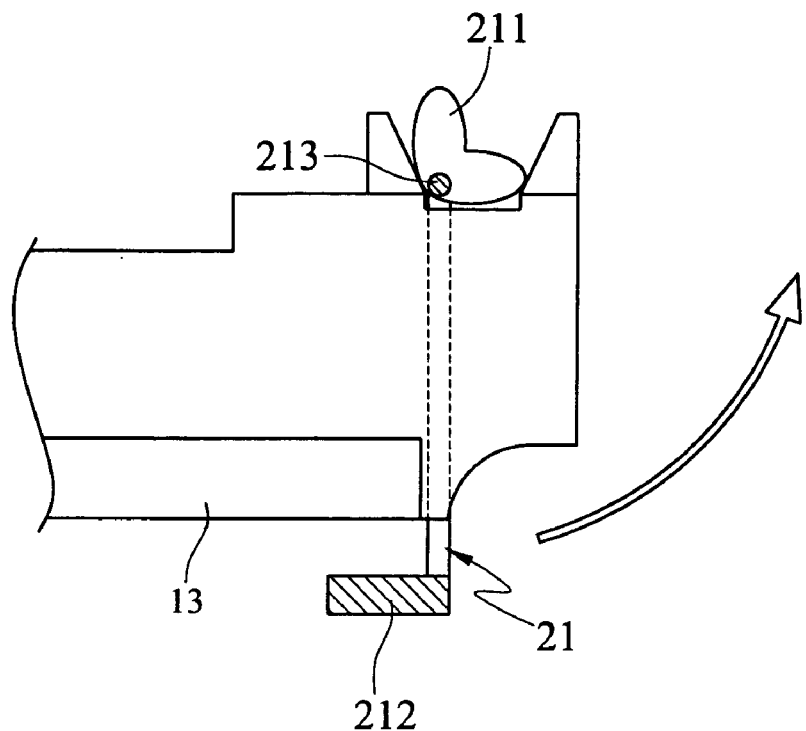
FIGS. 6A through 6H are schematic views of various embodiments of the boss of the invention.
Figure 6B:
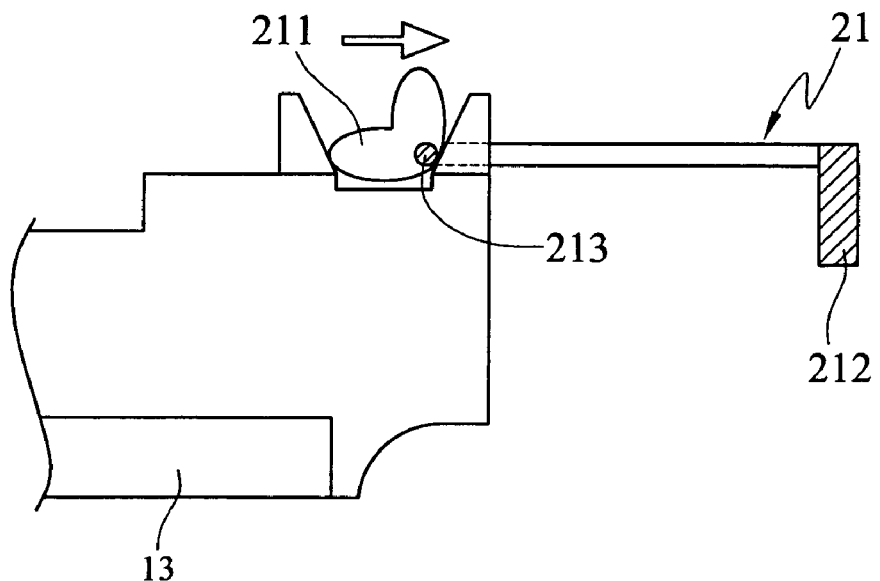
Figure 6C:
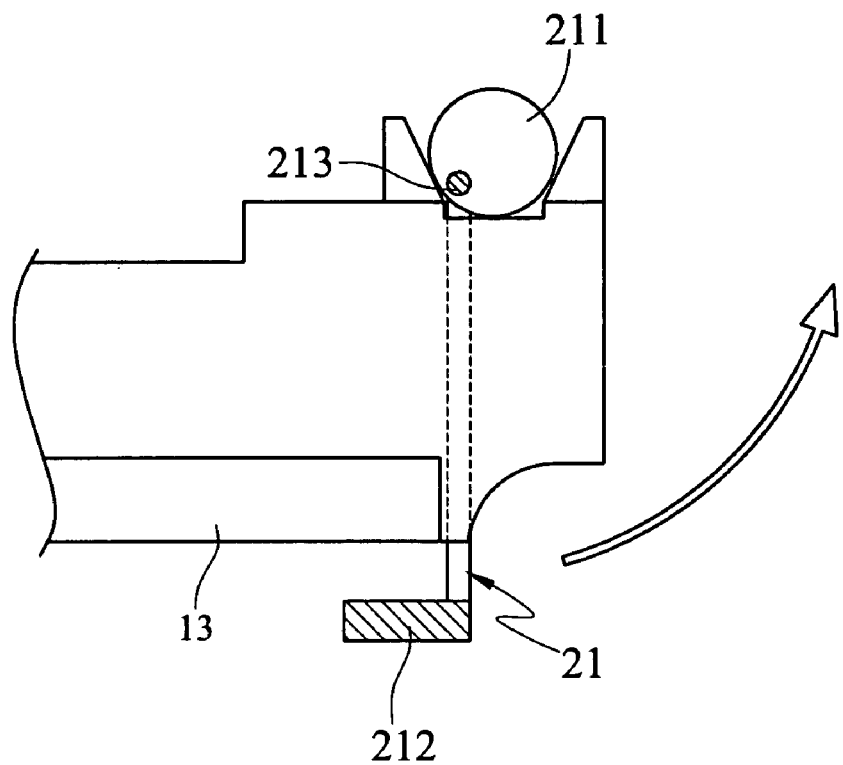
Figure 6D:
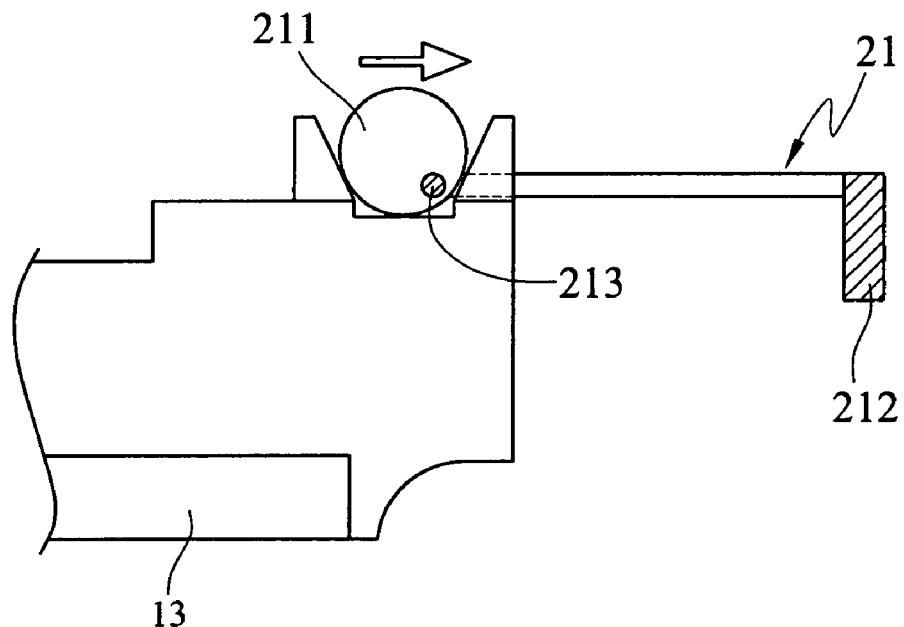
Figure 6E:
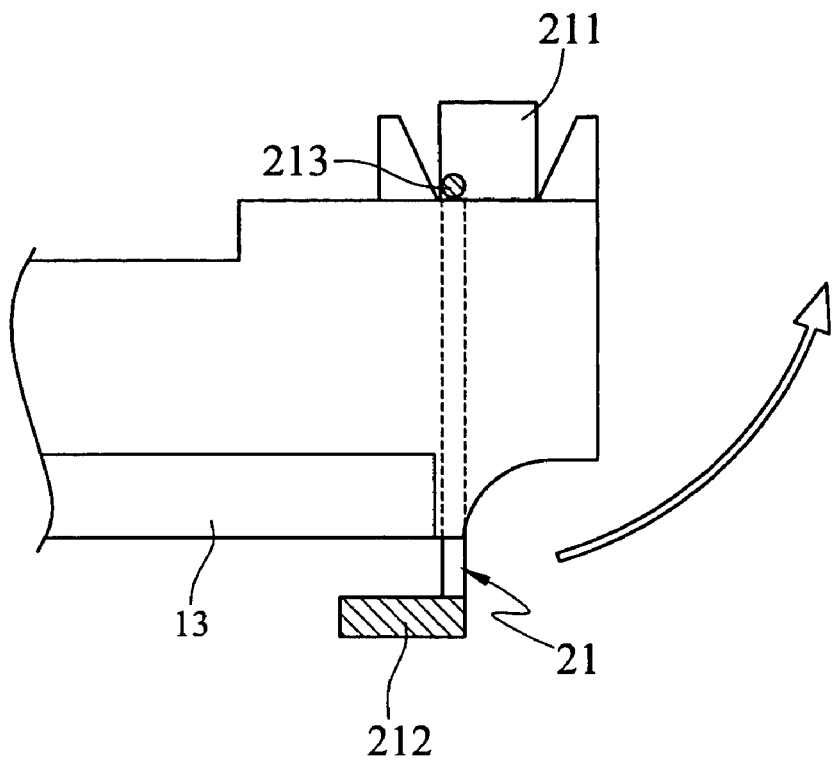
Figure 6F:
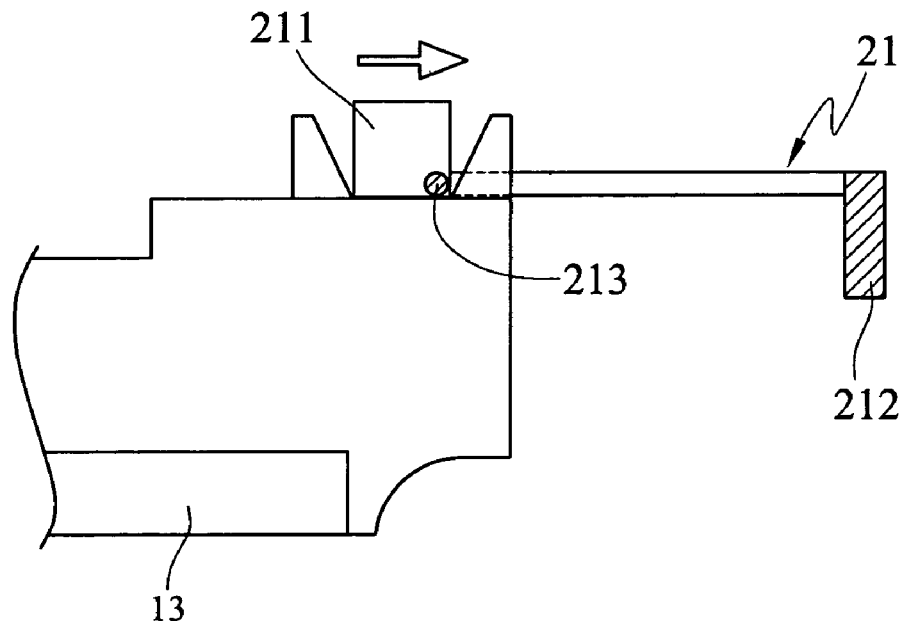
Figure 6G:
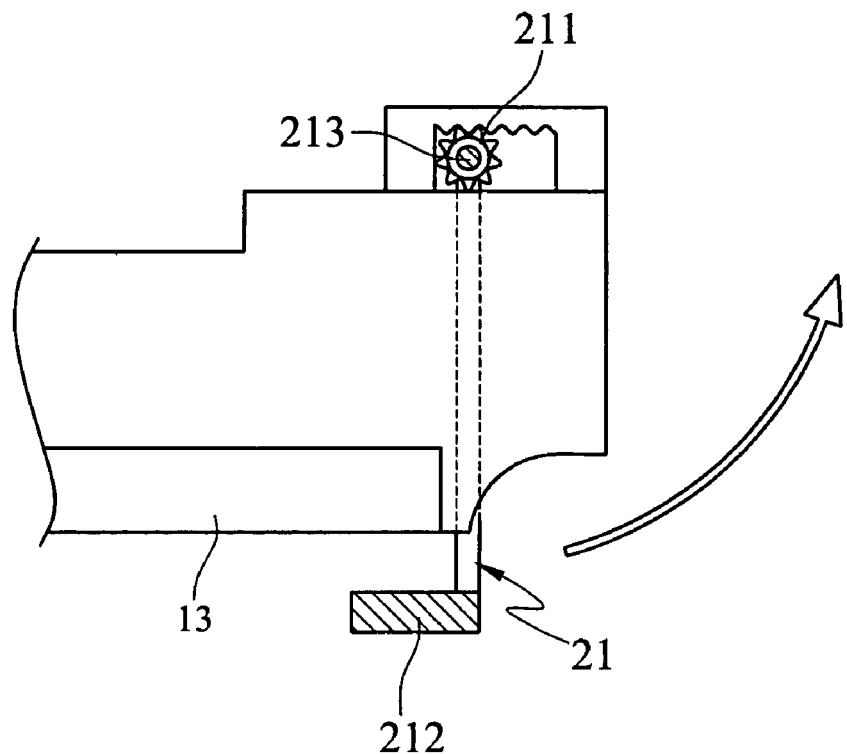
Figure 6H:
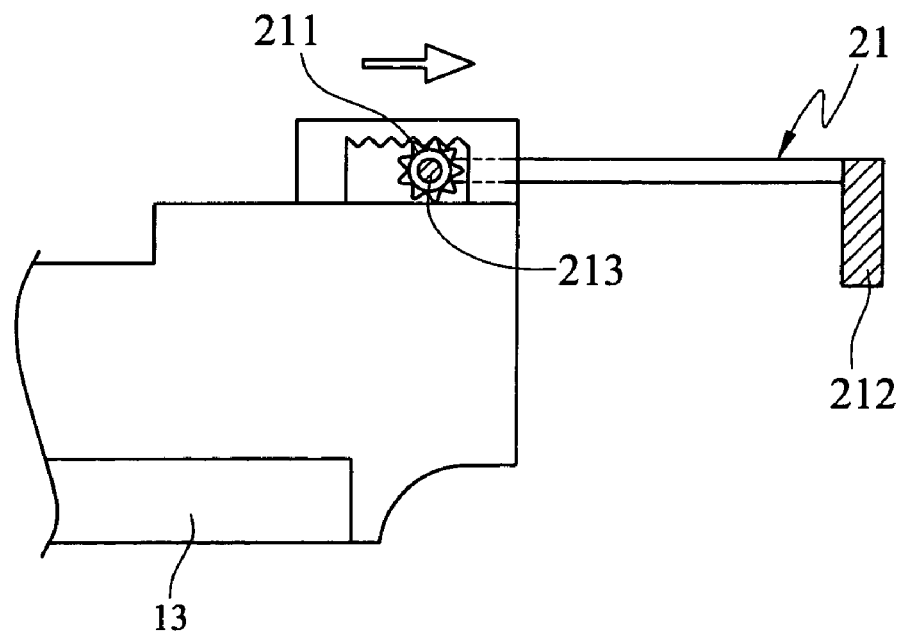

The mechanism set forth above has a simple structure and requires fewer elements. It's also cheaper, and fabrication and assembly are easier. The sliding sections 221 and 222 may be formed in a reed or become a single element rather than two arms as shown in the drawings. Similarly, the latch sections 2211 and 2221 that are jutting to the left and the right sides serve only as an example and are not the limitation. They may be formed in an up and down manner or become a single latch section. The boss 211 on the axle of the lever aims to slide on the contact sides of the latch trough 23 to generate a horizontal movement for the lever. It may be formed in various shapes such as containing two bosses 211 (referring to FIGS. 6A and 6B), or a member with substantially a circular cross section to couple with the axle 213 on an eccentric location (referring to FIGS. 6C and 6D), or a member with substantially a square cross section to couple with the axle 213 on an eccentric location (referring to FIGS. 6E and 6F); or the latch trough may have a plurality of protrusive elements formed on the datum plane to couple with the boss (referring to FIGS. 6G and 6H).

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A latch mechanism for a pluggable optical module to selectively couple the pluggable optical module on an electronic device, comprising:
   a lever having an axle to couple one end of the optical module, the axle having at least one boss located thereon;
   a latch trough located on the optical module to hold the boss having a datum plane in contact with the boss to allow the axle to form a latch position and a release position; and
   a sliding member slidably located on the optical module to couple with the lever;
   wherein in normal conditions the axle is located on the latch position and the boss has one side pressing the datum plane to allow the sliding member to be latched on the electronic device to anchor the optical module on the electronic device; the lever being turnable about the axle relative to the optical module to move the boss away from to the release position and drive the lever to move relative to the optical module so that the sliding member is moved relative to the optical module and disengaged with the electronic device to form a released condition.

2. The latch mechanism of claim 1, wherein the lever has a handle and two struts extended from two ends of the handle to couple with the axle to allow the lever to be turned relative to the optical module.

3. The latch mechanism of claim 1, wherein the sliding member includes a sliding section and a latch section jutting transversely on a distal end of the sliding section, the latch section coupling the sliding member on the electronic device in the latch position.

4. The latch mechanism of claim 3, wherein the sliding member is coupled to the lever through the sliding section and is slidable when driven by the lever.

5. The latch mechanism of claim 1, wherein the sliding member includes two sliding sections clipping two sides of the optical module, the sliding sections having respectively a transverse jutting latch section to couple the sliding member on the electronic device in the latch position.

6. The latch mechanism of claim 5, wherein the two sliding sections are bridged by a coupling section and coupled on the lever, and are slidable when driven of the lever.

7. The latch mechanism of claim 1, wherein the boss has a cross section formed substantially in a fan shape which has two sides to become a first contact side and a second contact side.

8. The latch mechanism of claim 7, wherein the first contact side rests on the datum plane when the axle is located in the latch position.

9. The latch mechanism of claim 7, wherein the second contact side rests on the datum plane when the axle is located in the release position.

10. The latch mechanism of claim 1, wherein the boss has an ellipsoidal cross section.

11. The latch mechanism of claim 1, wherein the boss has a circular cross section.

12. The latch mechanism of claim 1, wherein the boss has a polygonal cross section.

13. The latch mechanism of claim 1, wherein the boss is formed by extending along the axle.

14. The latch mechanism of claim 1, wherein at least one of the boss is in contact with the datum plane of the latch trough and at least one of another bosses in contact with a sidewall of the latch trough.

15. The latch mechanism of claim 1, wherein the datum plane of the latch trough has a plurality of protrusive elements to couple with the boss.

* * * * *

UNITED STATES PATENT AND TRADEMARK OFFICE
CERTIFICATE OF CORRECTION

| | | |
|---|---|---|
| PATENT NO. | : 7,004,772 B1 | Page 1 of 1 |
| APPLICATION NO. | : 10/972559 | |
| DATED | : February 28, 2006 | |
| INVENTOR(S) | : Hsiao et al. | |

It is certified that error appears in the above-identified patent and that said Letters Patent is hereby corrected as shown below:

Title page

Item (73) Assignee's residence:

"Industrial Technology Research Institute, Hsinchu (CN)" should be changed to --Industrial Technology Research Institute, Hsinchu (TW)--

Signed and Sealed this
Twenty-third Day of June, 2015

Michelle K. Lee
*Director of the United States Patent and Trademark Office*